F. RICHARDSON.
PNEUMATIC TIRE.
APPLICATION FILED JUNE 22, 1907.

905,584.

Patented Dec. 1, 1908.
2 SHEETS—SHEET 1.

WITNESSES:
Chas. W. Luther
Ada E. Hagerty

INVENTOR:
Frederick Richardson
By Joseph H. Miller
ATTORNEY.

F. RICHARDSON.
PNEUMATIC TIRE.
APPLICATION FILED JUNE 22, 1907.

905,584.

Patented Dec. 1, 1908.
2 SHEETS—SHEET 2.

WITNESSES:
Chas. W. Luther
Ada E. Hagerty

INVENTOR:
Frederick Richardson
by Joseph H. Miller
ATTORNEY.

UNITED STATES PATENT OFFICE.

FREDERICK RICHARDSON, OF PROVIDENCE, RHODE ISLAND.

PNEUMATIC TIRE.

No. 905,584.      Specification of Letters Patent.      Patented Dec. 1, 1908.

Application filed June 22, 1907. Serial No. 380,232.

*To all whom it may concern:*

Be it known that I, FREDERICK RICHARDSON, a citizen of the United States, residing at Providence, in the county of Providence and State of Rhode Island, have invented a new and useful Improvement in Pneumatic Tires, of which the following is a specification.

This invention has reference to an improvement in pneumatic tires and more particularly to an improvement in a puncture proof and non-skidding tread or armor for pneumatic tires.

The object of my invention is to improve the construction of pneumatic tires for automobiles and other road vehicles whereby skidding or side slipping of the tire is prevented, the tread of the tire protected against punctures, and traction wear on the tire reduced to a minimum.

My invention consists in the peculiar and novel construction of a flexible non-skidding and puncture proof tread for pneumatic tires, said tread comprising a plurality of metal plates, each plate having an outwardly-extending central boss, lateral lips, a transverse opening and a longitudinal recess in its under side and held in position by a transverse strip of fabric through the transverse opening and a longitudinal strip of fabric in the longitudinal recess, the whole forming an integral part of the tire or in the form of a shoe mechanically secured to the tire and having details of construction, as will be more fully set forth hereinafter and claimed.

Figure 1:
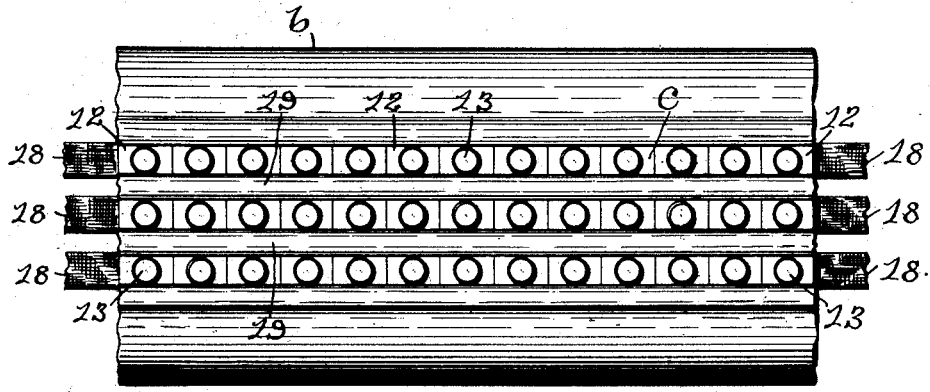
Figure 2:
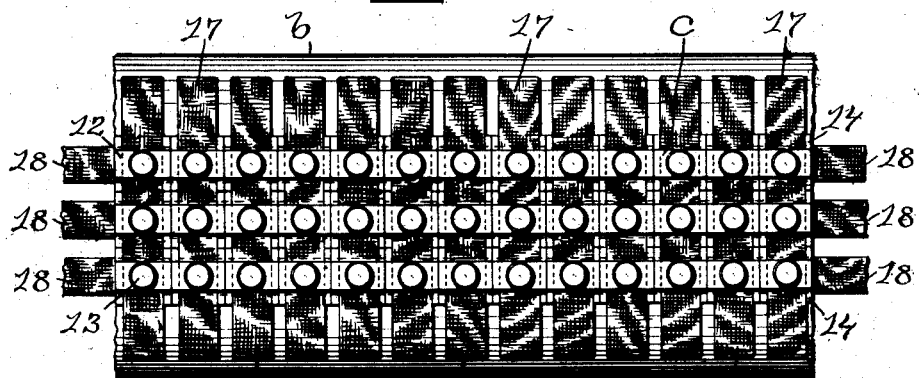
Figure 3:
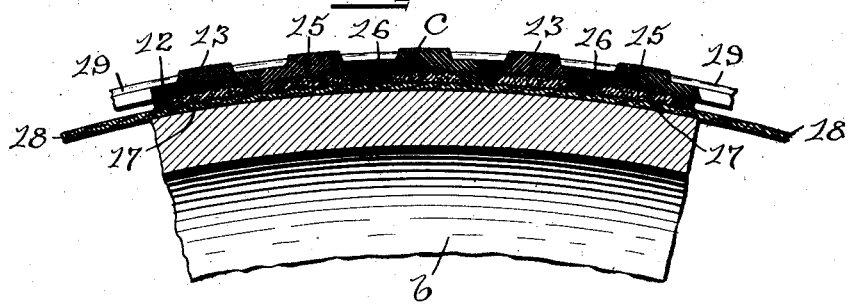
Figure 4:
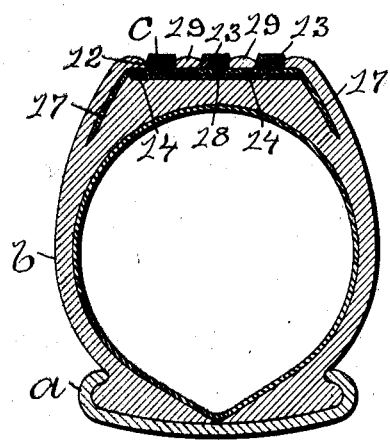
Figure 5:
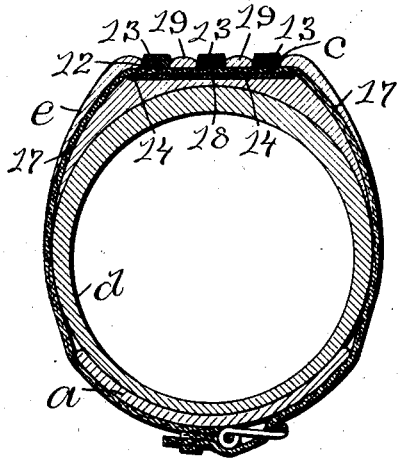
Figure 6:
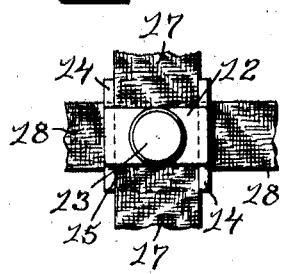
Figure 7:
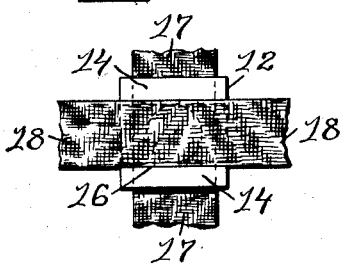
Figure 8:
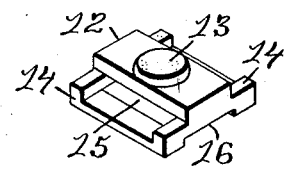
Figure 9:
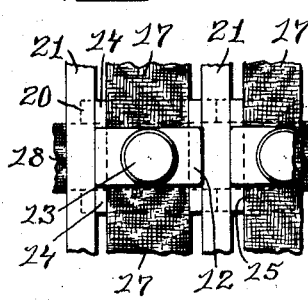
Figure 10:
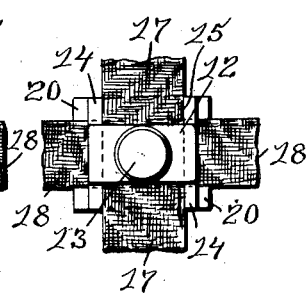
Figure 11:
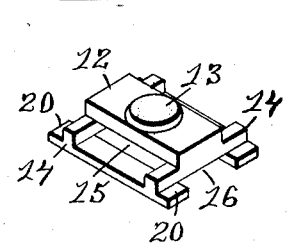

Figure 1 is a face view of a portion of a pneumatic tire having my improved flexible non-skidding and puncture proof tread. Fig. 2 is a face view similar to Fig. 1, showing the outer face of the tire removed to show the construction of the tread. Fig. 3 is an enlarged detail sectional view taken lengthwise through the tread of the tire. Fig. 4 is a transverse sectional view through a wheel rim and detachable tire, showing my improved tread formed integral with the tire. Fig. 5 is a transverse sectional view through a wheel rim and single tube tire showing the tread in the form of a shoe detachably secured to the tire. Fig. 6 is an enlarged detail face view of one of the plates, showing a portion of the transverse and longitudinal fastening strips. Fig. 7 is an enlarged detail view similar to Fig. 6 looking at the under surface of the plate. Fig. 8 is an enlarged perspective view of the plate. Fig. 9 is an enlarged detail face view of a modified form of plate showing the plates spread longitudinally and the interstices filled with transverse strips of rubber. Fig. 10 is an enlarged face view similar to Fig. 9, showing the transverse strips of rubber removed, and Fig. 11 is an enlarged perspective view of the modified form of plate.

In the drawings, $a$ indicates a wheel rim, $b$ a detachable form of pneumatic tire, $c$ my improved flexible non-skidding and puncture proof tread, $d$ a single tube form of pneumatic tire, and $e$ a detachable shoe having my improved tread.

My improved flexible non-skidding and puncture-proof tread $c$ consists of a plurality of square metal plates 12 12, each plate having the outwardly-extending central boss 13, the lateral lips 14 14, the thin transverse opening 15, and the thin longitudinal recess 16 in the underside of the plate, as shown in Fig. 8. The plates are securely held on the face of the tire in three annular parallel rows by transverse strips 17 17 constructed preferably of fabric impregnated with or coated with rubber, each transverse strip passing through the transverse openings 15 15 of three of the plates and the ends of the strips embedded in the tube, as shown in Fig. 4, and by three longitudinal strips 18 18 18 passing through the recesses 16 16 in each annular row of plates and cemented to the transverse strips 17 17 in the transverse openings 15 15 and to the face of the tire. The plates 12 12 are now held in close contact with each other and from longitudinal movement by the transverse strips 17 17 and from side movement by the longitudinal strips 18 18. The longitudinal or annular grooves between the plates formed by the lateral lips 14 14 on the plates are filled by longitudinal strips 19 19 of rubber, thereby forming a flexible non-skidding and puncture proof tread of metal and rubber, which when the tire is vulcanized, forms an integral part of the tire.

In the form shown in Fig. 5, my improved tread is formed as described integral with a shoe $e$ which is detachably secured to the tire by transverse straps and buckles or other well known means.

In the modified form of plate, as shown in Figs. 9, 10 and 11, the plates 12 12 each have in addition the end lips 20 20 forming transverse grooves between the plates which are filled level with the outer faces of the lateral lips 14 14 by transverse strips 21 21 of rubber, as shown in Fig. 9. These transverse strips 21 21 are cemented to the longitudinal strips 18 18 of fabric and to the longitudinal strips 19 19 of rubber.

In use a pneumatic tire provided with my improved tread has great flexibility or resiliency, is puncture proof, skidding or side slipping is prevented, the traction of the tire is improved and the life of the tire greatly increased.

In the preferred form the plates 12 12 are constructed to form a flat tread, as shown in Figs. 4 and 5. It is evident that the plates could be constructed to form a curved or round tread if desired and any number of annular rows of plates may be used without materially affecting the spirit of my invention.

Having thus described my invention, I claim as new and desire to secure by Letters Patent;—

1. In a pneumatic tire, a protecting armor consisting of a plurality of metal plates having lateral extensions secured to the tread by longitudinal and transverse strips of fabric cemented to the tire.

2. In a pneumatic tire, a metal and rubber non-skidding and puncture proof tread consisting of a plurality of metal plates having lateral lips and secured to the face of the tire by transverse and longitudinal strips of fabric and longitudinal strips of rubber in the grooves formed by the lateral lips on the plates.

3. A pneumatic tire protection consisting of a plurality of metal plates having transverse recesses on the undersides with lateral extensions for securing them to the face of the tire by longitudinal and transverse strips of fabric, as described.

4. In a pneumatic tire, a non-skidding and puncture proof tread consisting of a plurality of metal plates having outwardly-extending bosses and secured to the face of the tire by transverse strips of fabric extending through openings in the plates and embedded in the tire.

5. In a pneumatic tire, a non-skidding and puncture proof tread consisting of a plurality of metal plates secured to the face of the tire by transverse strips of fabric extending through openings in the plates and embedded in the tire, and means for preventing said movement of the plates comprising longitudinal strips of fabric extending through recesses in the under surface of the plates.

6. In a pneumatic tire, a metal and rubber non-skidding and puncture proof tread consisting of a plurality of metal plates each plate having a central boss, lateral lips, a transverse opening and a recess in the under side and secured to the face of the tire against longitudinal movement by a transverse strip of fabric extending through the opening in the plate and embedded in the tire and against side movement by a longitudinal strip of fabric extending through the recess in the under side of the plate and strips of rubber in the grooves formed by the lateral lips on the plates.

7. In a pneumatic tire, a metal and rubber non-skidding and puncture proof tread consisting of a substratum of rubber, a plurality of metal plates having lateral lips, a transverse opening and a longitudinal recess in the under side and secured to the face of the substratum of rubber in annular parallel rows and against longitudinal movement by a transverse strip of rubber impregnated fabric extending through the opening in the plate and embedded in the substratum of rubber and against side movement by a longitudinal strip of rubber impregnated fabric extending through the recess in the under side of the plate, strips of rubber in the grooves formed by the lateral lips on the plates, and means of forming the substratum of rubber with the tread, integral with the tire, consisting of vulcanizing the substratum of rubber to the face of the tire.

8. In a pneumatic tire, a metal and rubber non-skidding and puncture proof tread consisting of a substratum of rubber in the form of a tire shoe, a plurality of metal plates each plate having a central boss, lateral lips, a transverse opening and a longitudinal recess in the underside and secured to the face of the shoe in annular parallel rows and against longitudinal movement by transverse strips of rubber coated fabric extending through the openings in the plates and embedded in the shoe and against side movement by longitudinal strips of rubber coated fabric extending through the recesses in the under side of the plates, strips of rubber in the grooves formed by the lateral lips on the plates, and means for detachably securing the shoe with the tread to the tire.

9. In a pneumatic tire, a non-skidding and puncture proof tread consisting of a plurality of metal plates 12 12, each plate having a central boss 13, the lateral lips 14 14, a transverse opening 15 and a longitudinal recess 16 in the under side of the plate, and means for securing the plates to the face of the tire against sidewise and longitudinal movement, as described.

10. In a pneumatic tire, a non-skidding and puncture proof tread consisting of a plurality of metal plates 12 12, each plate having a central boss 13, the lateral lips 14 14, a transverse opening 15, a longitudinal recess 16 and the end lips 20, means for securing the plates to the face of the tire against sidewise and longitudinal movements, and means for filling the grooves formed by the end lips 20 20 consisting of strips of rubber in the grooves, as described.

In testimony whereof I have signed my name to this specification in the presence of two subscribing witnesses.

FREDERICK RICHARDSON.

Witnesses:
 ADA E. HAGERTY,
 J. A. MILLER.